Jan. 25, 1949.    H. I. RICHARDS    2,459,839
DELIVERY TRUCK LOADING AND DISPENSING APPARATUS
Filed Aug. 11, 1944    4 Sheets-Sheet 1
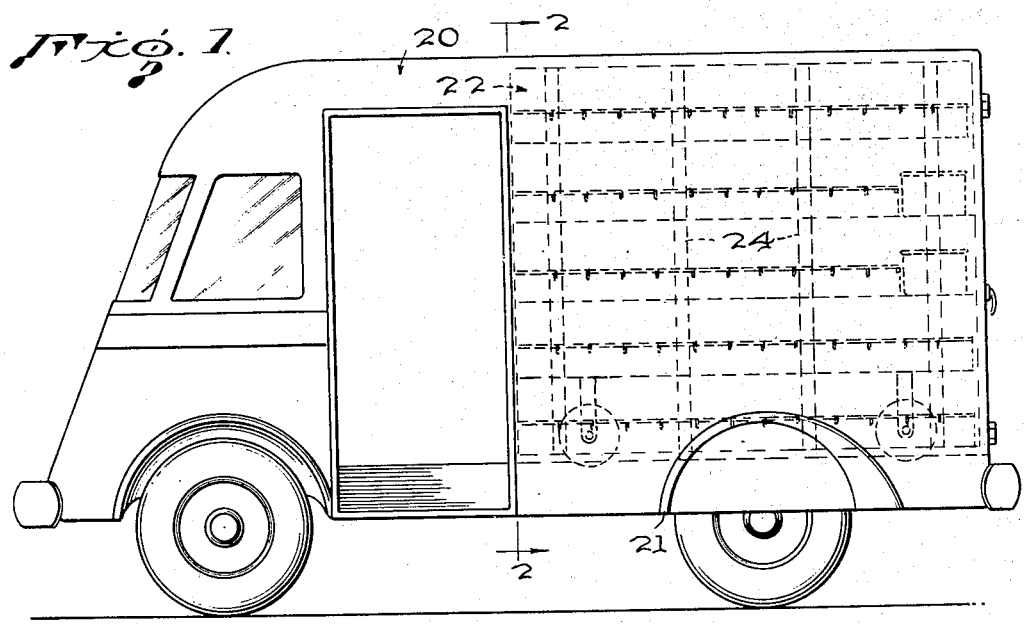
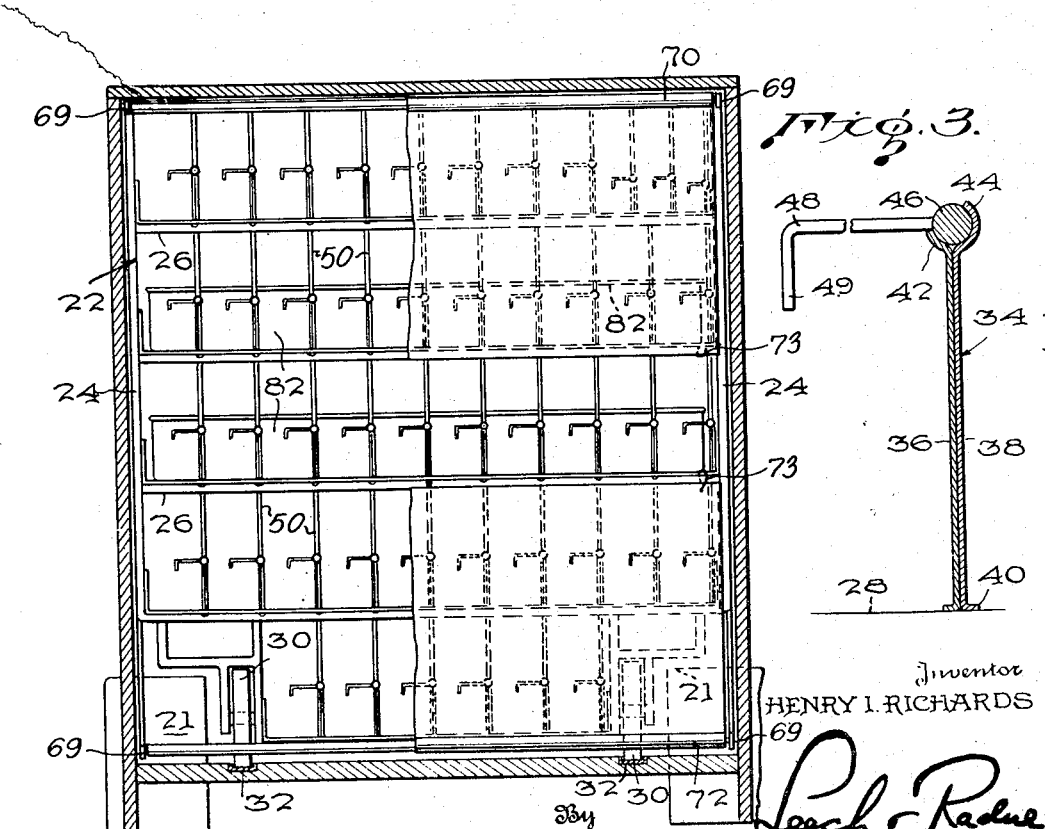
Inventor
HENRY I. RICHARDS

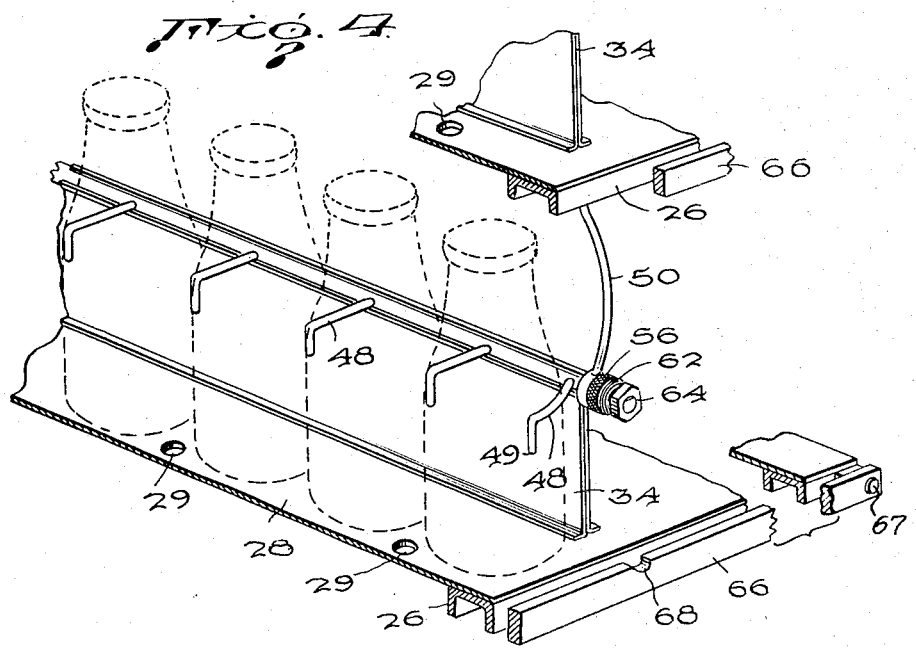
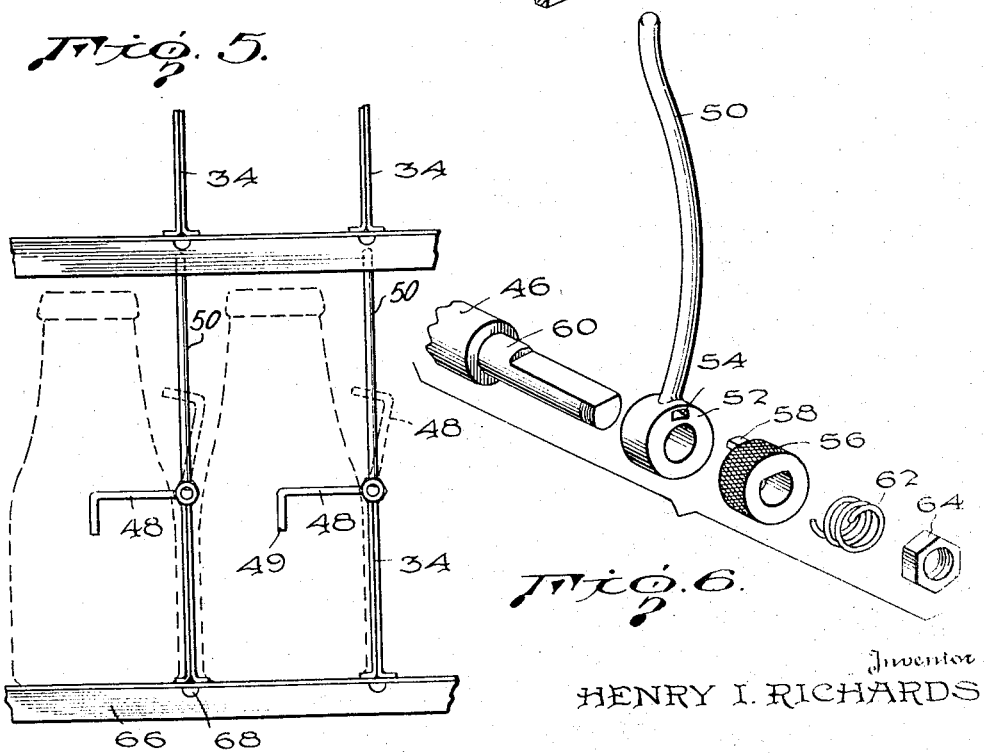

Jan. 25, 1949.   H. I. RICHARDS   2,459,839
DELIVERY TRUCK LOADING AND DISPENSING APPARATUS
Filed Aug. 11, 1944.   4 Sheets-Sheet 3
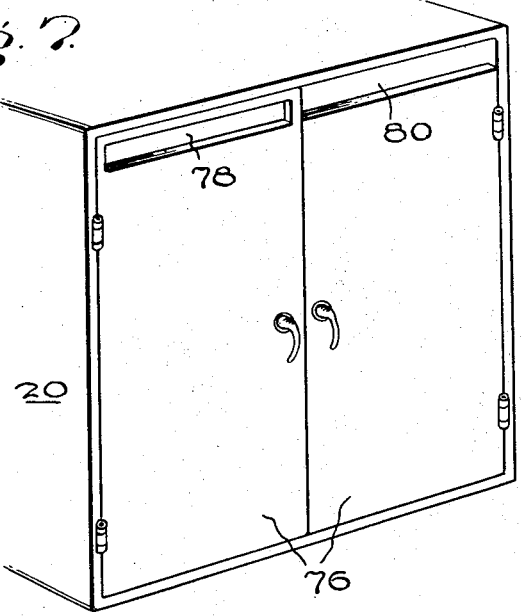
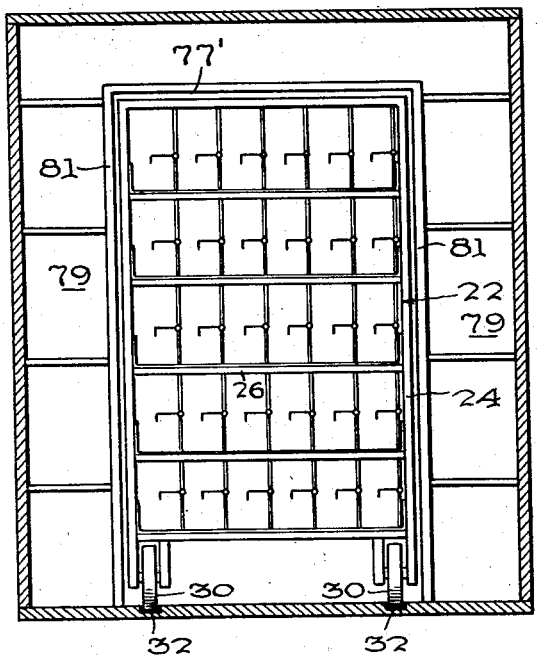
HENRY I. RICHARDS Jan. 25, 1949. H. I. RICHARDS 2,459,839
DELIVERY TRUCK LOADING AND DISPENSING APPARATUS
Filed Aug. 11, 1944 4 Sheets-Sheet 4

Inventor
HENRY I. RICHARDS
By Leech & Radue Attorneys

Patented Jan. 25, 1949

2,459,839

UNITED STATES PATENT OFFICE 2,459,839

DELIVERY TRUCK LOADING AND
DISPENSING APPARATUS

Henry I. Richards, Arlington, Va.

Application August 11, 1944, Serial No. 549,046

17 Claims. (Cl. 296—24)

This invention relates generally to loading apparatus and more particularly to an apparatus for expeditiously loading delivery trucks which includes means whereby the truck may also be selectively unloaded at will.

Although the principles and structure of the apparatus comprising the present invention are applicable to many types of delivery trucks and the articles carried thereby, they are of particular advantage in the handling of articles of a perishable nature, such as packaged ice cream, butter, milk, etc. For purposes of illustration the apparatus is herewith shown as applied to the loading of milk in glass containers or packages although it may be readily adapted for the handling of milk as furnished in the present day cardboard packages.

For many years it has necessarily been the practice of the drivers of milk trucks to load them with the necessary number of cases of milk by hand. Inasmuch as each driver is usually required to make several delivery trips, a goodly portion of his working day is accordingly spent in the loading of his truck before each of his delivery trips. An additional portion of the milk driver's working day is necessarily used up or wasted in the shifting of empty milk bottle cases about the delivery truck in order that the drivers may have ready access to the remaining filled cases of milk. Moreover, in many instances the drivers of milk delivery trucks find it simpler to drop empty cases in groups along the delivery routes and subsequently retrace their steps upon completion of the route in order to regain the empty cases so deposited. Obviously, the foregoing procedures are highly wasteful of man hours and equipment.

Accordingly, it is the chief object of the present invention to provide a loading and dispensing apparatus which will substantially eliminate the time lost in loading packages on delivery trucks, maintain packages of a perishable nature in excellent condition during delivery, and expedite the selective dispensing of the packages from the truck upon arrival at each of the required delivery stops.

Another important object of the present invention is to provide a loading and dispensing apparatus which will materially increase the package-carrying capacity of various types of existing delivery trucks and correspondingly reduce the number of trips required for the delivery of a number of such packages.

A further important object of the present invention is to provide an apparatus which may be preloaded with packages and subsequently rolled bodily within a delivery truck, the apparatus being provided with means enabling selective dispensing of the packages as required without interference from empty cases, etc., or other full containers.

A further object of the invention is to provide a package-loading and dispensing apparatus for delivery trucks including novel means for refrigerating the packages or maintaining such packages in a refrigerated condition for the duration of the usual delivery trip.

A still further object of the invention is to provide a loading and dispensing apparatus for delivery trucks which is simply constructed, easily operated, rugged and long wearing in use and economical in initial cost.

Other objects and advantages of the invention will be apparent during the course of the following description:

In the drawings I have disclosed two embodiments of my invention. In these showings:

Figure 1 is a view in side elevation of a milk delivery truck showing the manner in which the loading and dispensing apparatus comprising the present invention is positioned therein;

Figure 2 is a vertical sectional view taken on the line 2—2 of Figure 1;

Figure 3 is a vertical sectional view of one of the partitions separating the rows of bottles of milk contained on the various shelves of the loading apparatus;

Figure 4 is a fragmentary perspective view to an enlarged scale illustrating the manner in which the milk bottles are positioned on the shelves of the loading apparatus with respect to the dispensing means;

Figure 5 is a view in end elevation similar to Figure 4 and illustrating the manner in which the rake fingers positioned between the respective milk bottles may be pivoted to a vertical position to permit insertion of bottles in the row or the retraction of the rake to normal position without interfering with bottles in the row;

Figure 6 is an exploded detailed view to an enlarged scale of the operating handle assembly on the rake rod;

Figure 7 is a perspective view of the rear of the milk delivery truck showing the upper ventilating slots;

Figure 10:
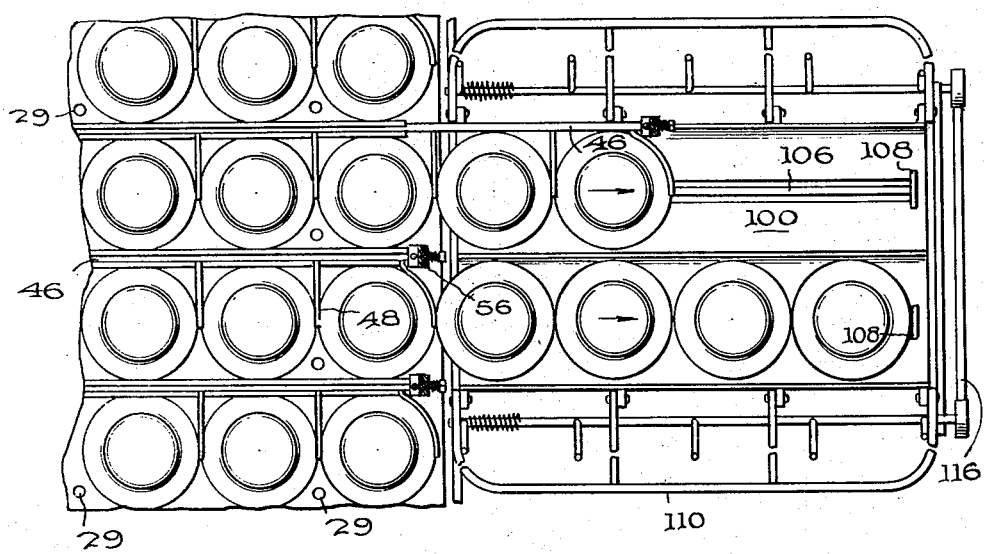
Figure 11:
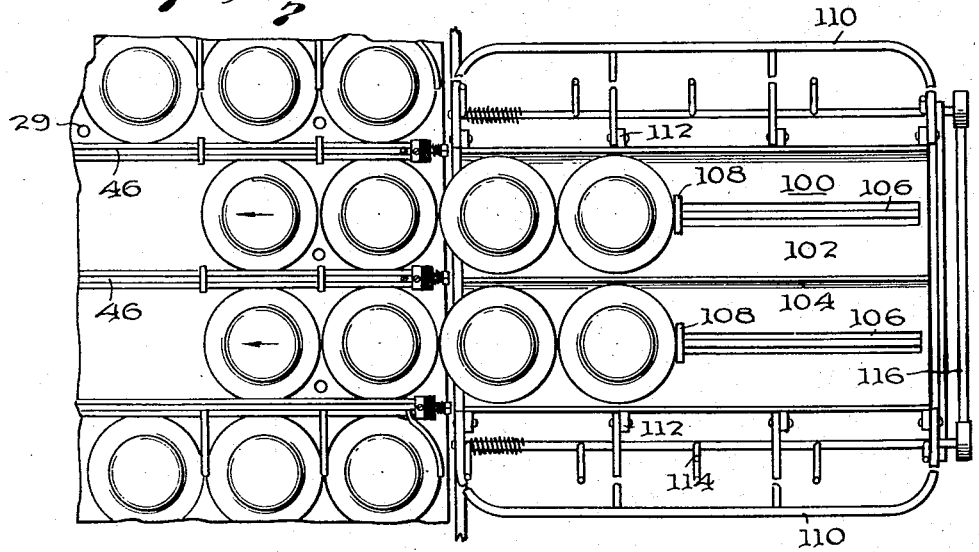
Figure 9:
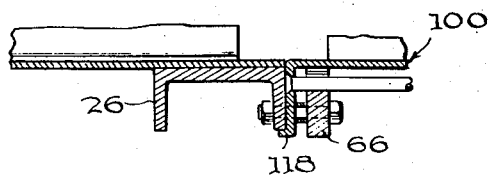

Figure 8 discloses a slightly modified form of the invention for use with a milk delivery truck body having a narrow rear door or doors;

Figure 9 is a detail view in cross-section of the bar for supporting the milk bottle tray in an aligned position adjacent the loading apparatus shelves during loading or dispensing;

Figure 10 is a plan view illustrating the manner in which milk bottles are dispensed from a shelf into a milk bottle tray, and Figure 11 is a plan view illustrating the manner in which empty milk bottles are loaded from a tray into the shelves of the loading apparatus.

Referring now to the drawings, numeral 20 designates a conventional milk delivery truck closed at the rear by a door or doors extending substantially from one side to the other. As is common in a truck of this nature, the floor space in the load-carrying portion of this truck is rectangular and entirely flat and clear with the exception of the portions occupied by the fender wells 21 of the two rear wheels as shown (Figures 1 and 2).

The novel loading and dispensing apparatus comprising the present invention is designed to fit within and closely adjacent the sides of the truck body described and comprises a rectangular frame structure 22. This frame structure includes a plurality of vertical channel members 24 connected by suitable horizontal U-shaped channel members 26 to form a rigid frame. This frame structure includes a plurality of U-shaped shelves 28 secured thereto which are formed from sheet metal of sufficiently heavy gauge so as to provide a substantial support for the load which is to be carried. Each of the shelves 28 is provided with a plurality of perforations 29 for a purpose which will be described.

The loading frame 22 is provided with two pairs of wheels 30 suitably mounted thereon, either pair of which may be caster wheels in order to facilitate the moving of the apparatus from place to place. It will be noted that the wheels 30 are disposed laterally within the sides of the delivery truck body 20 so as to avoid the wheel wells extending through the floor. In order to facilitate the insertion of the wheeled frame 22 within the truck body 20, a pair of tracks 32 comprising shallow channels are mounted in longitudinally extending recesses in the floor of the truck body (Figure 2).

Except for the top shelf, which covers the frame, each of the shelves 28 support longitudinally extending partition members 34 (Figures 3–5) which are formed from a pair of sheet metal members 36 and 38 which are flanged outwardly at their bottoms as at 40. These supporting flanges may be spot welded along their lengths to the shelf 28 and members 36 and 38 to each other to form an integral structure. The upper edges of the sheet metal members 36 and 38 are also flanged outwardly as at 42 and 44 to form a longitudinally extending arcuate bearing for a rake rod 46 extending the length of the wheeled frame. The rod 46 is retained in its bearing by the substantial encirclement of the flanges 42 and 44.

Each rake rod 46 has integrally provided therewith a plurality of regularly spaced laterally extending fingers 48 having downturned bottle-engaging ends 49 which act as separating partitions to define compartments for each of the bottles in each longitudinal row and also as means to move such bottles toward the front of the truck for dispensing purposes.

It will be noted that the rake fingers 48, when in horizontal position, are supported by the upper edge of the arcuate flange 42, and upon rotation of the rake rod 46 in a clockwise direction, they move through an angle of somewhat more than 90° until they abut the upper edge of the arcuate flange 44. Moreover, the rake rod 46 with its rake fingers 48 may be slid forwardly on its bearing flanges 42 and 44 to effect the dispensing of articles on the shelves by the fingers.

As seen in Figure 6, the front end of each rake rod 46 is provided with an operating handle lever 50 integrally mounted on a collar 52, in the front radial face of which is provided a lug receiving depression 54. A knurled handle knob 56 is positioned adjacent the operating handle 50 and is provided with a lug 58 for cooperation with the depression 54 as will be presently described. The end of the rod 46 is reduced in diameter and its major portion is D-shaped in cross-section.

The bore of the collar 52 permits the operating handle lever 50 to be rotatably mounted on the circular portion 60 of the reduced end of the rod 46 abutting the shoulder formed by the reduced end portion. The knurled handle knob 56 with its D-shaped bore is next mounted on the reduced D-shaped portion of the rod 46 with its lug 58 projecting into the depression 54. The spring 62 is now inserted over the end of the rod and the nut 64 retains the assembly thereon.

This assembly permits the knob 56 to be pulled outwardly against the spring 62 to disengage the lug 58 from the depression 54 so that rotation of the rod 46 by the knob may be independent of the lever 50 as desired and for a purpose which will become apparent. It will be seen that normal rotary movement of lever 50 will rotate rake rod 46 through the coupling of the former with knob 56. As seen in Figure 4, when the rod 46 is in its retracted or normal position, the upper end of the lever 50 is frictionally held in a vertical position behind the outermost shelf supporting channel 26, this being facilitated by a relatively loose fit of the collar 52 on the portion 60 of the rod 46 and also by the spring 62.

The wheeled frame 22 is also provided with a transversely extending bar 66 which is rigidly secured at its ends to, as at 67, but spaced from and positioned directly in front of each of the front end shelf-supporting channels 26. These bars 66 are provided with notches 68 aligned with the vertical and longitudinally extending partition members 34 and act to support and correctly align or position a bottle-carrying tray of the type disclosed by my copending application Serial No. 551,219, filed August 25, 1944, now Patent No. 2,428,386, granted October 7, 1947, during the loading and dispensing of packages on and from the shelves.

The wheeled frame 22 supports at its front end by means of brackets 69 fixed to members 24, a pair of upper and lower roller type curtain members 70 and 72, respectively, which may be unrolled in the normal manner toward each other and suitably fastened by conventional means such as laterally spaced hooks 73, so as to completely enclose the front end of the wheeled frame and its shelves 28. When dispensing packages from a shelf, the curtain members 70 and 72 are adjusted vertically so as to uncover only the end of that one shelf, the lower curtain being maintained in adjusted position by being fastened to one of the bars 66.

The sides, rear end and top of the wheeled frame, when in position within the milk delivery truck, are enclosed by and slightly spaced from the sides, top and door thereof which are normally wooden panel members. In such cases where the paneling of the milk delivery truck body is of sheet metal, etc., the inner surfaces of the sides, door and top are preferably provided with suitable insulating material. The back of the truck is closed by one or more doors 76 (Figure 7) which may be provided in their upper portions with a transversely extending narrow rectangular slot 78 as shown in the left hand door or the upper portion of the door may be shortened so as to provide an opening 80 between it and the roof of the truck.

As stated, the wheeled frame 22 fits snugly within the body of the milk delivery truck. However, in order that the frame may be expeditiously inserted therewithin a certain amount of clearance is necessary and provided between the sides of the frame and the sides of the truck. Moreover, the bottom shelf of the wheeled frame is spaced from but close to the floor of the delivery truck. Accordingly, it will be seen that an air space exists between the sides, rear end, bottom and top of the wheeled frame and the sides, end, bottom and top of the milk delivery truck.

Thus it will be seen that when the wheel frame loading apparatus is placed with its refrigerated load of milk bottles within the delivery truck body, it will be impossible for warm air to be trapped anywhere between it and the delivery truck body. Air may enter from the front of the load-carrying portion of the truck body and will pass around the sides, underneath, but most probably over the wheeled frame to pass out the slots 78 or 80 provided in the rear doors 76. Thus the refrigerated condition of the milk bottles will be maintained over greater periods of time due to the particular closure members arranged for the front and rear of the wheel frame and the insulated sides of the milk delivery truck. The refrigerated air between the shelves is substantially without motion and its warmer portions may pass upwardly through the perforations 29 to eventually collect under the top shelf. Air passing over this shelf, as explained, will remove the heat therein by convection.

Where the apparatus is to be used in localities experiencing higher temperature conditions, it is desirable that one or more of the shelves 28 has a rear portion of partition 34 removed and is equipped with a receptacle to carry ice or other cooling means so as to maintain the milk bottles in refrigerated condition despite the increase in temperature. Such receptacles 82 are shown placed on the second and third shelves 28 and extending transversely of the wheeled frame and having a width of about two bottles although the actual width will be determined by the amount of ice or cooling agent necessary to maintain the desired refrigerated condition. It will be noted that the overall bottle capacity of the wheel frame is thus only slightly reduced and the ice receptacles may also accommodate as desired, depending upon the amount of ice therein, such analogous goods as butter, eggs, etc.

In Figure 8 I have disclosed a modification of the invention in which the principles of construction and operation of the wheeled frame 22 are the same but which is adaptable in this case to milk truck delivery bodies having a rear door opening 77' of considerably less span. The adaptation of the loading and unloading apparatus comprising the present invention to this type of truck materially increases its bottle-carrying capacity and the space 79 between the walls of the wheeled frame and the walls of the delivery truck may be used for the storage of other commodities such as butter, eggs, etc. Such spaces may also contain shelves for carrying the various articles and also ice carrying containers.

It will be noted that it is not necessary in the present modification to position the wheels laterally within the sides of the wheeled frame so as to avoid the fender wells of the rear delivery truck wheels inasmuch as the sides of the rear door opening 77 are generally in alignment with the inner portions of such wells. Moreover, the spaces 79 are provided with vertical longitudinally extending insulating partition walls 81 forming a continuation of the rear door opening 77 and extending throughout the load-carrying space. In the present embodiment, the wheeled frame is also enclosed by its curtains and the sides, top, bottom and end of the delivery truck.

The loading and unloading apparatus described may or may not be used, as desired, in connection with a specially designed bottle-carrying tray 100 illustrated in Figures 10 and 11. Inasmuch as this bottle-carrying tray forms no part of the present invention, suffice it to say that it comprises a bottom portion 102 having an intermediate longitudinally extending partition 104 and a pair of longitudinally extending slots 106 in its bottom through which project a pair of manually operated bottle ejecting members 108.

The bottle-carrying tray is provided with a pair of coupled handle members 110 pivoted at points 112 on opposite sides of the tray. The handle members 110 carry partition fingers 114 which separate the bottles contained in the tray and also close its left end, its right end being closed by the coupling lever 116. Thus (as seen in Figures 10 and 11) when the handle members 110 are swung outwardly the left end of the bottle-carrying tray 100 is open so that bottles may be discharged into or from the spaces on either side of the central partition 104.

The bottle-carrying tray 100 is provided with a plurality of supporting legs 118, the front pair of which are adapted to be inserted between the supporting bar 66 and the channel 26 and hooked under the forward edge of the latter to secure the tray in self-supporting aligned relation with two columns of bottles on one of the shelves 28.

The advantages of the loading and dispensing apparatus comprising the present invention as combined with the delivery truck body will become readily apparent from the following description of the manner of its use.

As the milk bottles are delivered from conventional bottling machines at the plant they are manually loaded directly on to the wheeled frame 22 until the various shelves are completely filled with rows of bottles. The wheeled frame is then rolled directly into a refrigerated storage room with less effort having been expanded than during the usual loading of the milk cases.

When the milk delivery truck driver backs his truck up to the loading platform of the milk plant, the wheeled frame 22 with its refrigerated load of milk bottles is simply rolled from the refrigerated storage room into the truck body and the driver may then depart upon his route. Upon arriving at a stop at which a certain number of milk bottles must be delivered, the driver opens either or both of the front curtains 70 or 72 to expose one shelf of milk bottles and places the bottle-carrying tray 100 in self-supporting position upon the bar 66. The two chutes of the tray are automatically aligned with the two chutes on the shelf 28 by means of a centrally positioned rod on the bottom of the tray (not shown) which drops into the notch 68 by merely sliding the tray 100 laterally along the bar 66.

The left-hand operating lever 50 on the rake rod 46 when facing the shelves is now swung in a clockwise manner just enough to be released from behind the channel 26, is turned back to vertical position, and is then pulled outwardly so as to slide the rod 46 and its rake fingers 48 outwardly, the latter effecting a forward sliding of all the milk bottles in that row. Assuming that it is desired to deliver four bottles from the shelf 28 into the milk tray 100, the lever 50 is pulled forwardly until 4 bottles have been ejected from the shelf onto the tray. It will be obvious that all the bottles behind the 4 ejected bottles will also have moved forwardly, the outer 4 assuming the position of the ejected 4.

In order that the bottles may thus be progressively moved forwardly by action of the rake without being returned by the lever 50 to their original positions, the lever 50 is then rotated substantially 90° from a vertical position shown so as to rotate the rake fingers 48 to the dotted line position shown in Figure 5. The rake rod is then pushed all the way in. Upon reaching the full-in position, the lever 50 is rotated counterclockwise through the same angle so that it is automatically wedged behind the channel bar 26 and the rake fingers 48 again drop between the remaining bottles of milk on the shelf, the four rear compartments now being empty. This operation is repeated to fill the right side of the tray.

As seen in Figure 10 one side of the milk tray 100 has been loaded with four bottles of milk and the rake rod 46 is ready to be returned to its normal or retracted position. The other side of the milk tray is in the process of being loaded, and its rake rod 46 has been pulled outwardly about half of the required distance to fully load that side of the tray. It will be appreciated that after the rake fingers 48 have effected the movement of the bottles outwardly or forwardly they must be rotated upwardly to clear the line of milk bottles and then move rearwardly and finally rotate downwardly into a horizontal position to resume their normal position as partition fingers. If a tray is not used, the bottles may be removed manually from the shelves as each is ejected by the rake rod. Moreover, if desired, the lever 50 may be integrally mounted on the reduced end of shaft 46 as it will not interfere (upon clockwise rotation to a horizontal position to elevate the fingers 48) with bottles which would normally be inserted within the shelves two rows at a time.

Figure 11 discloses the manner in which empty milk bottles are discharged from the milk bottle tray 100 into an empty row of one of the shelves 28. The manually operated tray ejecting members 108 act on the forward side of the bottles simultaneously to push them back on to the shelf, and it will be noted that the rake fingers 48 in this case have been pivoted upwardly so as to permit free movement of the empty milk bottles in the particular rows being loaded with empty bottles. Upon completion of the ejection of the bottles from the milk tray 100 the rake fingers are returned to their horizontal positions.

In this case, however, it is not necessary to use the lever 50 which is primarily intended to dispense or eject loaded milk bottles from the shelves. It will be obvious, as seen in Figure 6, that rotation of the knurled knob 56, when retracted against the spring 52 so as to disengage the lug 58 from the depression 54, will effect rotation of the rod 46 to elevate the rake fingers 48 to the position shown in Figure 5. Accordingly, to dispense milk bottles from the shelves, lever 50 is used whereas it is only necessary to use knob 56 if it is desired to pivot the rake fingers 48 upwardly to permit discharge of empty bottles from a tray into the shelves 28.

It will be noted (Figure 2) that provision has been made for various size bottles such as pints and half-pints as seen in the right hand portion of the top shelf of the figure. Another feature of advantage in the present invention is the recessing of the handle operating assembly of the rake rod (see Figure 4) so that the handles 110 of the milk bottle tray 100 may be freely opened without striking the operating handle assembly when the tray is positioned in loading or unloading position on supporting bar 66.

It will now be apparent that the present invention provides novel means whereby milk delivery and other type trucks may be expeditiously loaded and unloaded, whereby the refrigerated milk bottles or other packages may be satisfactorily maintained in a refrigerated condition and which materially increases the capacity of the delivery truck so as to increase the number of stops which may be made with a single load. Moreover, the apparatus comprising the present invention is simply but ruggedly constructed and will readily withstand the normal rough usage to which such apparatus is subjected. The shelf carrying frame and its novel ejecting means may also be built into a delivery truck body in special cases, it then being loaded directly (for example, in the present illustration) from the milk bottling machine, or it may be utilized as a cabinet structure for the ready reception and dispensing of milk bottles or other packages.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A loading apparatus for delivery truck bodies comprising a wheeled frame including package receiving shelves, each of said shelves being provided with a plurality of vertical partitions to form separate package receiving rows, and ejector means mounted on said partitions and defining separate package receiving compartments in each row.

2. A loading apparatus for delivery truck bodies comprising a wheeled frame including package receiving shelves, each of said shelves being provided with a plurality of vertical partitions to form separate package receiving rows, and means mounted on said partitions to define separate package receiving compartments in each row, said means being movable to permit the insertion of packages into the end of each of said rows.

3. A loading apparatus for delivery truck bodies comprising a wheeled frame including package receiving shelves, each of said shelves being provided with a plurality of vertical partitions to form separate package receiving rows, and means mounted on said partitions to define separate package receiving compartments in each row, said means being slidable to dispense packages from the end of each row.

4. A loading apparatus for delivery truck bodies comprising a wheeled frame including package receiving shelves, each of said shelves being provided with a plurality of vertical partitions to form separate package receiving rows, and means mounted in said rows to define separate package receiving compartments in each row, said means being constructed and arranged for rotation in a vertical plane and sliding movement in a horizontal plane to effect loading and dispensing of packages on said shelves.

5. A loading apparatus for delivery truck bodies comprising a wheeled frame including package receiving shelves, each of said shelves being protions to form separate package receiving rows, form separate package receiving rows, and means mounted in said rows to define separate package receiving compartments in each row, said means comprising a slidably journalled rake rod including a plurality of spaced laterally extending rake fingers.

6. A loading apparatus for delivery truck bodies comprising a wheeled frame including package receiving shelves, each of said shelves being provided with a plurality of vertical partitions to form separate package receiving rows, means mounted in said rows to define separate package receiving compartments in each row, said means comprising a slidably journalled rake rod including a plurality of spaced laterally extending rake fingers, and operating means mounted on one end of said rake rod to effect movement of said rake fingers.

7. A loading apparatus for delivery truck bodies comprising a wheeled frame including package receiving shelves, each of said shelves being provided with a plurality of vertical partitions to form separate package receiving rows, and means mounted in said rows to define separate package receiving compartments in each row, said means comprising a slidably journalled rake rod including a plurality of spaced laterally extending rake fingers, and operating means mounted on one end of said rake rod to effect movement of said rake fingers, said operating means comprising a cooperating lever and knob for selectively effecting rotary or sliding movement of said rod.

8. A loading apparatus for delivery truck bodies comprising a wheeled frame including package receiving shelves, each of said shelves being provided with a plurality of vertical partitions to form separate package receiving rows, and means mounted in said rows to define separate package receiving compartments in each row, said means comprising a slidably journalled rake rod including a plurality of spaced laterally extending rake fingers, and operating means mounted on one end of said rake rod to effect movement of said rake fingers, said operating means comprising a cooperating lever and knob for selectively effecting rotary or sliding movement of said rod, said lever and knob being constructed and arranged for independent or coupled movement.

9. A loading apparatus for delivery truck bodies comprising a wheeled frame including package receiving shelves, each of said shelves being provided with a plurality of vertical partitions to form separate package receiving rows, and means mounted on said partitions to define separate package receiving compartments in each row, each of said partitions comprising a sheet metal member flanged at its upper end to form a bearing for said compartment defining means.

10. A loading apparatus for delivery truck bodies comprising a wheeled frame including package receiving shelves, each of said shelves being provided with a plurality of vertical partitions to form separate package receiving rows, means mounted on said partitions to define separate package receiving compartments in each row, and a transversely extending bar mounted on said frame adjacent but spaced from the front edges of each of said shelves, said bar being adapted to cooperate with and support an adjacent edge of a tray and align rows in said tray with said package receiving rows for loading of said package receiving rows.

11. A frame including package receiving shelves, a plurality of vertical partitions mounted on said shelves and forming package receiving rows, and means mounted on said partitions and constructed and arranged to dispense packages from the ends thereof, said means defining together with said partitions separate package receiving compartments in each row.

12. A loading apparatus for delivery truck bodies of the type having a load carrying space normally completely open at the front and provided with walls, a roof, and a slotted rear door, comprising a wheeled frame having package-carrying shelves and being constructed and arranged to fit closely within said space adjacent the walls and roof thereof, the spacing of said frame from the truck body providing a passage for the flow of air from the front of the load-carrying space to the rear door slot, and a plurality of vertically movable closure members mounted on the frame to provide access to any single shelf at a time and otherwise close the front end of the frame to prevent air flow therethrough and to direct air flow thereabout.

13. A loading apparatus for delivery truck bodies of the type having a load-carrying space normally completely open at the front and provided with walls, a roof, and a slotted rear door, comprising a wheeled frame having package-carrying shelves and being constructed and arranged to fit closely within said space adjacent the walls and roof thereof, the spacing of said frame from the truck body providing a passage for the flow of air from the front of the load-carrying space to the rear door slot, and a plurality of vertically movable closure members mounted on the frame to provide access to any single shelf at a time and otherwise close the front end of the frame to prevent air flow therethrough and to direct air flow thereabout, said wheeled frame when enclosed by said means and the door, walls and roof forming a compartment for prolonging the original temperature conditions of packages upon said frame.

14. A loading apparatus for delivery truck bodies of the type having a load-carrying space normally completely open at the front and provided with walls, a roof, and a slotted rear door, comprising a wheeled frame having package-carrying shelves and being constructed and arranged to fit closely within said space adjacent the walls and roof thereof, the spacing of said frame from the truck body providing a passage for the flow of air from the front of the load-carrying space to the rear door slot, a plurality of vertically adjustable roller curtains mounted at spaced points on said frame and closing the front end of the frame to prevent air flow therethrough and to direct air flow thereabout, and means mounted on said frame for selectively dispensing articles therefrom.

15. A loading apparatus for delivery truck bodies of the type having a load carrying space normally completely open at the front and provided with walls, a roof, and a slotted rear door, comprising a wheeled frame having package-carrying shelves and being constructed and arranged to fit closely within said space adjacent the walls and roof thereof, the spacing of said frame from the truck body providing a passage for the flow of air from the front of the load-carrying space to the rear door slot, and a plurality of vertically adjustable roller curtains mounted at spaced points on said frame and closing the front end of the frame to prevent air flow therethrough and to direct air flow thereabout, said wheeled frame being adapted to receive refrigerating means therein.

16. A loading apparatus for delivery truck bodies of the type having a load-carrying space normally completely open at the front and provided with walls, a roof, and a slotted rear door, comprising a wheeled frame having package-carrying shelves and being constructed and arranged to fit closely within said space adjacent the walls and roof thereof, the spacing of said frame from the truck body providing a passage for the flow of air from the front of the load-carrying space to the rear door slot, a plurality of vertically adjustable roller curtains mounted at spaced points on said frame and closing the front end of the frame to prevent air flow therethrough and to direct air flow thereabout, said shelves being provided with vertical partitions to form package-receiving rows, and ejecting means mounted in said rows and defining separate package-receiving compartments in each row.

17. A loading apparatus for delivery truck bodies comprising a wheeled frame including package-receiving shelves, each of said shelves being provided with a plurality of vertical partitions to form separate package-receiving rows, ejector means mounted in said rows and defining separate package-receiving compartments in each row, and refrigerating means mounted within said frame, said shelves including a plurality of perforations formed therein to permit circulation of air therethrough.

HENRY I. RICHARDS.

REFERENCES CITED

The following references are of record in the file of this patent:

UNITED STATES PATENTS

| Number | Name | Date |
|---|---|---|
| 993,796 | Repetto | May 30, 1911 |
| 1,030,180 | Hillyer | June 18, 1912 |
| 1,146,738 | Shannon | July 13, 1915 |
| 1,291,420 | Cough | Jan. 14, 1919 |
| 1,589,687 | Greene | June 22, 1926 |
| 1,829,936 | Koenig | Nov. 3, 1931 |
| 1,890,257 | Hafner et al. | Dec. 6, 1932 |
| 1,986,022 | Stahl | Jan. 1, 1935 |
| 1,990,046 | Mayrose | Feb. 5, 1935 |
| 1,994,160 | Zeigler | Mar. 12, 1935 |
| 2,007,595 | Brykczynski et al. | July 9, 1935 |
| 2,133,347 | Fedeler | Oct. 18, 1938 |
| 2,194,828 | Greaves | Mar. 26, 1940 |
| 2,344,650 | Sloat | Mar. 21, 1944 |